US011828329B2

(12) United States Patent
Misiaszek et al.

(10) Patent No.: US 11,828,329 B2
(45) Date of Patent: Nov. 28, 2023

(54) BEARING CAGE ASSEMBLY WITH ONE-PIECE ANNULAR RETAINER

(71) Applicant: AKTIEBOLAGET SKF, Gothenburg (SE)

(72) Inventors: Matthew Misiaszek, Jamestown, NY (US); Arun Menon, Roscoe, IL (US); Thomas W Lunz, Jamestown, NY (US)

(73) Assignee: AKTIEBOLAGET SKF, Gothenburg (SE)

( * ) Notice: Subject to any disclaimer, the term of this patent is extended or adjusted under 35 U.S.C. 154(b) by 25 days.

(21) Appl. No.: 17/573,066

(22) Filed: Jan. 11, 2022

(65) Prior Publication Data

US 2023/0220878 A1 Jul. 13, 2023

(51) Int. Cl.
*F16C 33/46* (2006.01)
(52) U.S. Cl.
CPC .................. *F16C 33/467* (2013.01)
(58) Field of Classification Search
CPC ............ F16C 33/4611; F16C 33/467
See application file for complete search history.

(56) References Cited

U.S. PATENT DOCUMENTS

| | | | | |
|---|---|---|---|---|
| 1,878,057 A | * | 9/1932 | Wooler | F16C 19/36 384/578 |
| 3,051,534 A | * | 8/1962 | Kohler | F16C 33/4641 29/898.15 |
| 6,857,785 B2 | * | 2/2005 | Takahashi | F16C 33/547 475/179 |
| 11,105,371 B2 | * | 8/2021 | Berg | F16C 19/26 |
| 2020/0132121 A1 | * | 4/2020 | Carpenter | F16C 33/4641 |

FOREIGN PATENT DOCUMENTS

| | | |
|---|---|---|
| CN | 216199880 U | 4/2022 |
| CN | 216407481 U | 4/2022 |

OTHER PUBLICATIONS

Search Report from the British Patent Office dispatched Jun. 13, 2023 in related application No. GB2218286.9.

* cited by examiner

*Primary Examiner* — James Pilkington
(74) *Attorney, Agent, or Firm* — J-TEK LAW PLLC; Scott T. Wakeman; Mark A. Ussai

(57) ABSTRACT

A cage assembly includes an annular cage disposable within the bearing outer ring and having a centerline, an inner radial end defining a bore, an outer radial end and a plurality of pockets extending between the inner and outer radial ends and spaced circumferentially about the centerline. Each pocket contains a separate one of the rolling elements. A flexible annular retainer is disposed against the inner radial end of the cage and has a plurality of through holes. Each one of the plurality of retainer holes is radially aligned with a separate one of the plurality of cage pockets and has a dimension with a value less than a diameter of each rolling element. As such, a radially inner portion of the rolling element contained within the aligned cage pocket extends through the retainer hole while a remainder of the rolling element is retained within the cage pocket.

14 Claims, 11 Drawing Sheets

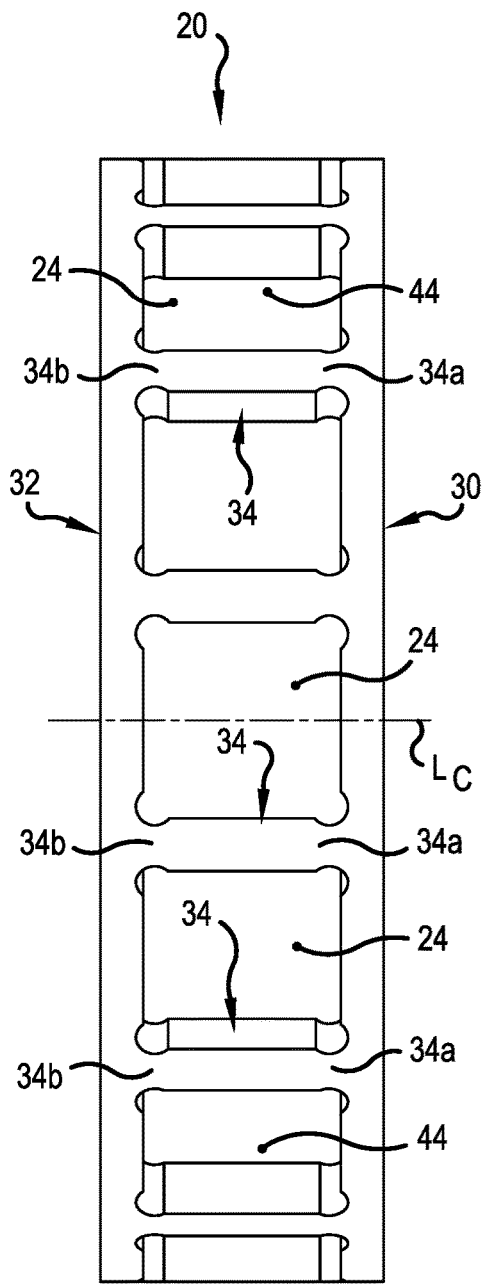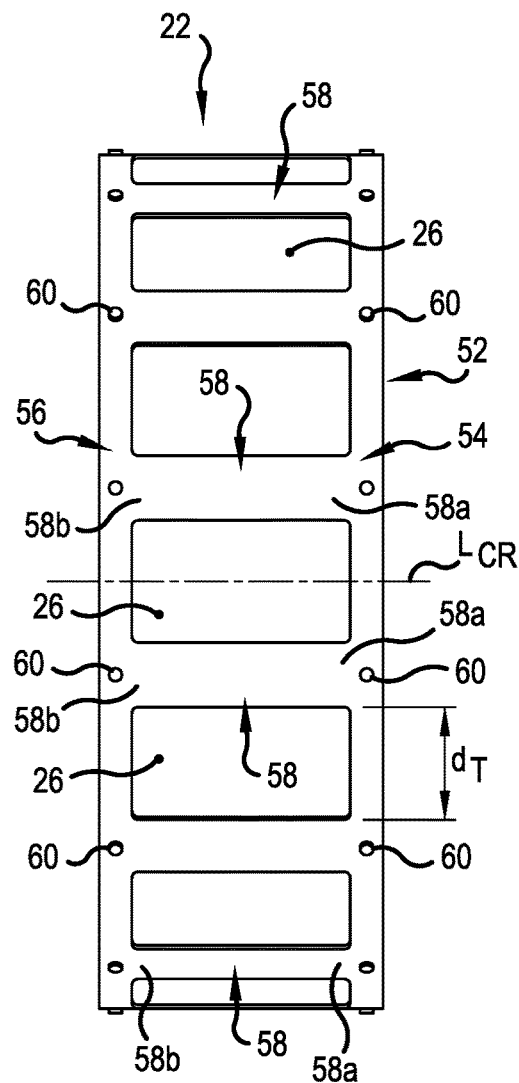
FIG.6
FIG.7

BEARING CAGE ASSEMBLY WITH ONE-PIECE ANNULAR RETAINER

BACKGROUND OF THE INVENTION

The present invention relates to bearings, and more particularly to cages for retaining the rolling elements of rolling element bearings.

Rolling element bearings are well known and basically include an inner ring, an outer ring and a plurality of rolling elements disposed between and rotatably coupling the inner and outer rings. In many applications, a cage is included in the bearing to maintain a desired spacing between the rolling elements, and in certain cases, to retain the rolling elements when the bearing does not include an inner ring and the elements are intended to roll directly upon a shaft. Although there are numerous different designs, a cage is typically annular, whether formed of a one-piece member or multiple connected pieces, and includes a plurality of pockets for containing the rolling elements.

In one known design, the cage is formed as a one-piece annular member having a plurality of radially inwardly extending tangs located adjacent to each pocket. After installation of the rollers into the pockets, the tangs are bent so as to extend circumferentially and are engageable with the rollers to prevent the rollers from falling inwardly out of the pockets prior to installation of an inner member, such as a shaft or a bearing inner ring, within the bearing outer ring. Such a "bent tang" construction requires a certain amount of radial spacing between the cage and the inner member for the inwardly extending tangs and is labor intensive to bend all of the tangs. Also, as bending the tangs plastically deforms the material of the cage, there is a potential risk of material failure and therefore "scrapping" of the cage during production.

SUMMARY OF THE INVENTION

In one aspect, the present invention is a cage assembly for retaining rolling elements of a bearing, the bearing having an outer ring and an inner ring. The cage assembly comprises an annular cage disposable within the bearing outer ring and having a centerline, an inner radial end defining a bore, an outer radial end and a plurality of pockets extending between the inner and outer radial ends. The plurality of pockets are spaced circumferentially about the centerline and each pocket is configured to contain a separate one of the rolling elements. A flexible annular retainer is disposed against the inner radial end of the cage and has a plurality of through holes, each one of the plurality of retainer holes being radially aligned with a separate one of the plurality of cage pockets. Each retainer hole has a dimension with a value less than a diameter of each rolling element such that a radially inner portion of the rolling element contained within the aligned cage pocket extends through the retainer hole while a remainder of the rolling element is retained within the cage pocket.

In another aspect, the present invention is again a cage assembly as recited in the preceding paragraph and further in which the retainer is configured to be collapsible radially inwardly so as to be insertable within the cage bore when the rolling elements are installed within the cage pockets and alternatively expandable radially outwardly after installation of the retainer within the cage so as to become disposed against the inner radial end of the cage.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 6 is side elevational view of the annular cage;

FIG. 7 is a side elevational view of an annular retainer of the present cage assembly;

DETAILED DESCRIPTION OF THE INVENTION

Figure 1:
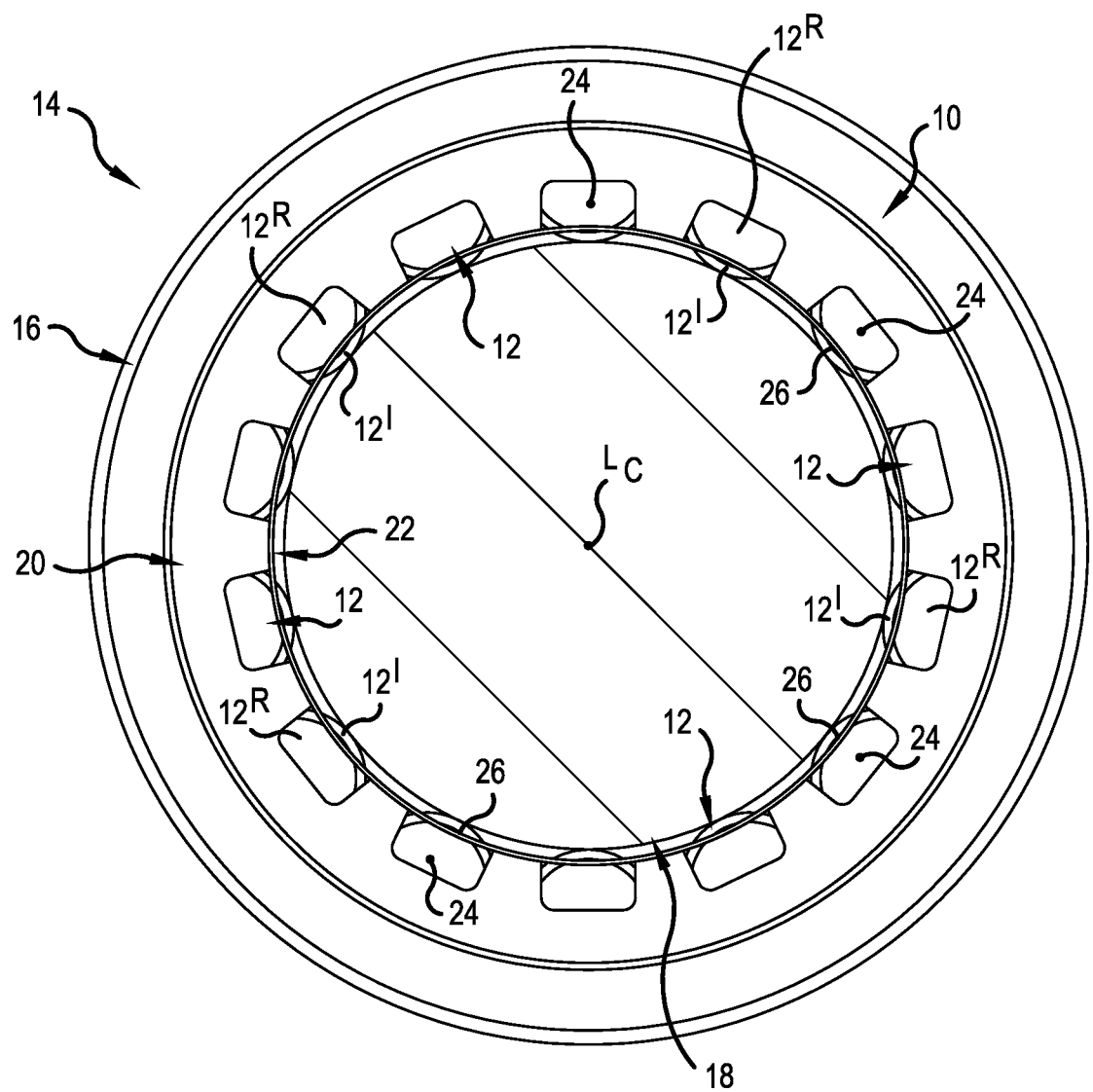
FIG. 1 is a front plan view of a bearing including a cage assembly of the present invention, shown mounted on a shaft.
Figure 2:
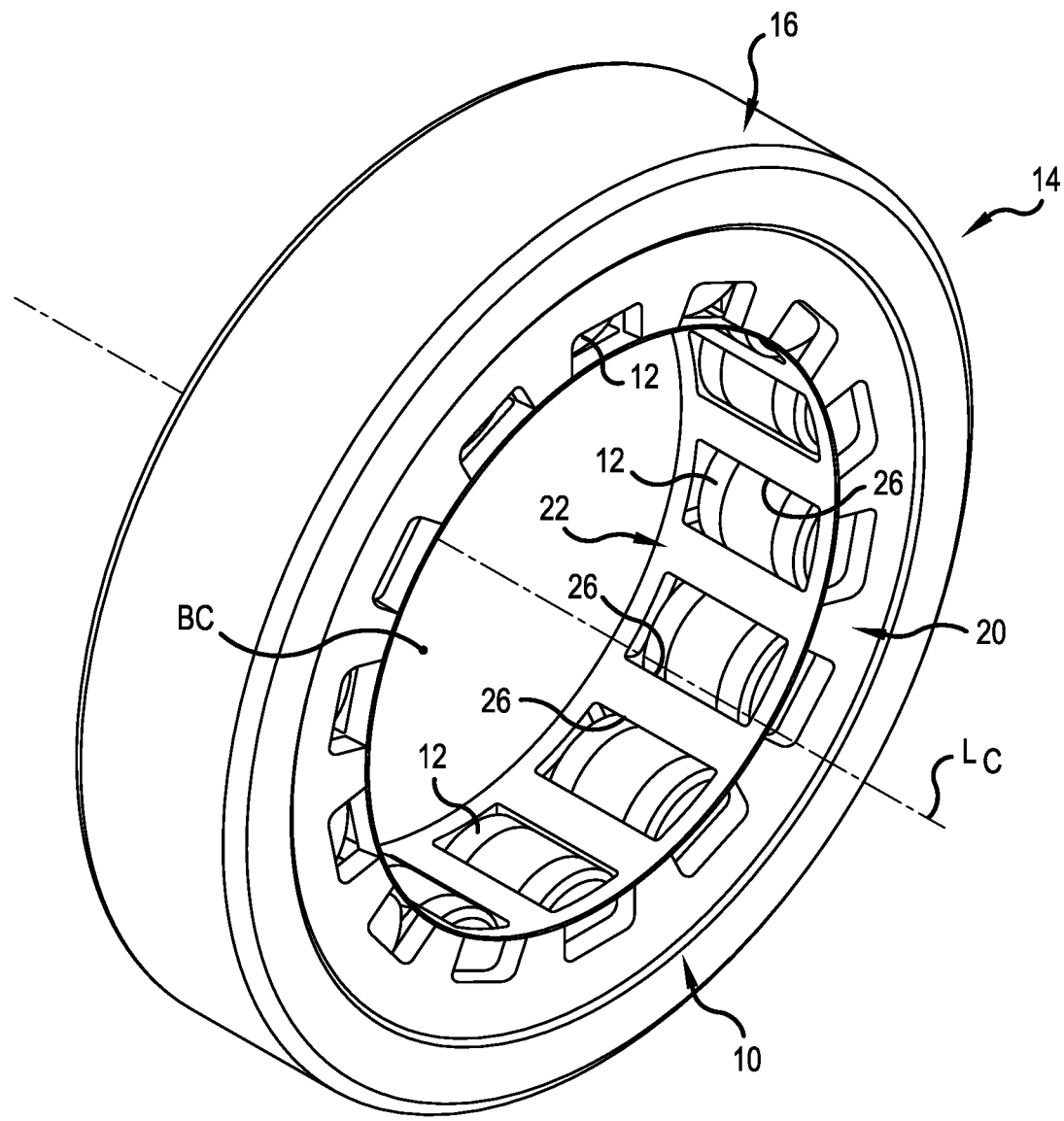
FIG. 2 is a perspective view of a bearing outer ring with the present cage assembly and rolling elements installed therein.
Figure 3:
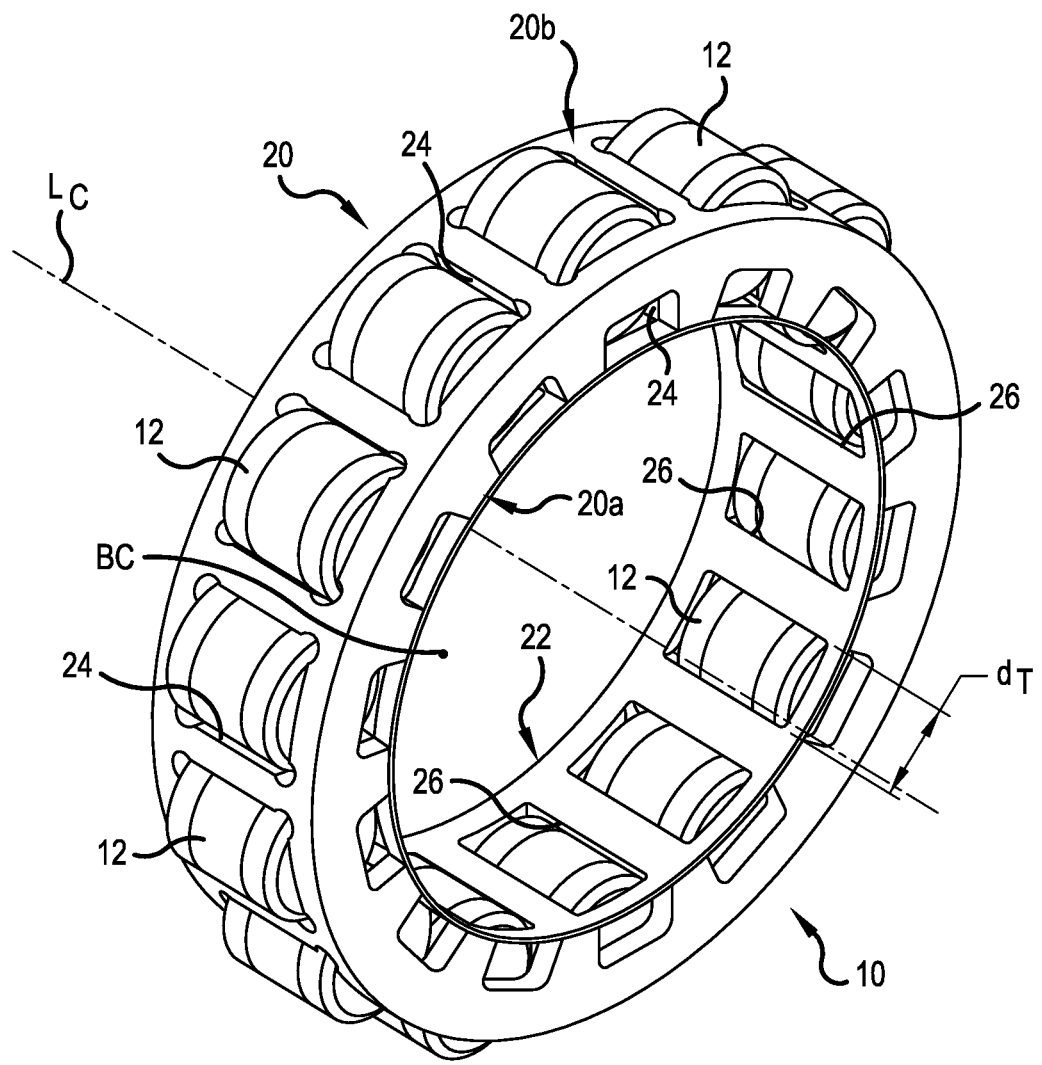
FIG. 3 is perspective view of the cage assembly shown with rolling elements installed in the cage pockets.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-14 a cage assembly 10 for a plurality of rolling elements 12 of a bearing 14. In a presently preferred application, the bearing 14 only includes an outer ring 16, the rolling elements 12 and the cage assembly 10, and is disposable within an outer member (e.g., a housing, a hub, etc., none shown) and about an inner member 18, preferably a shaft. However, in other applications, the bearing 14 may further include an inner ring (not shown) coupled to the outer ring 16 by the rolling elements 12. In any case, the cage assembly 10 basically comprises an annular cage 20 disposable within the bearing outer ring 16 and a one-piece, flexible annular retainer 22 installable within the annular cage 20. The annular cage 20 includes a plurality of pockets 24 for containing the rolling elements 12 and the annular retainer 22 is configured to retain the rolling elements 12 within the cage pockets 24, as described below.

More specifically, the annular cage 20 has a centerline $L_C$, an inner radial end 20a defining a cage bore BC and an outer radial end 20b. The plurality of pockets 24 extend radially between the inner and outer radial ends 20a, 20b and are spaced circumferentially about the cage centerline $L_C$. Each cage pocket 24 is configured to contain a separate one of the rolling elements 12 such that each rolling element 12 is freely rollable (i.e., without restriction from the cage 20) simultaneously against the bearing outer ring 16 and the inner member 18.

Figure 14:
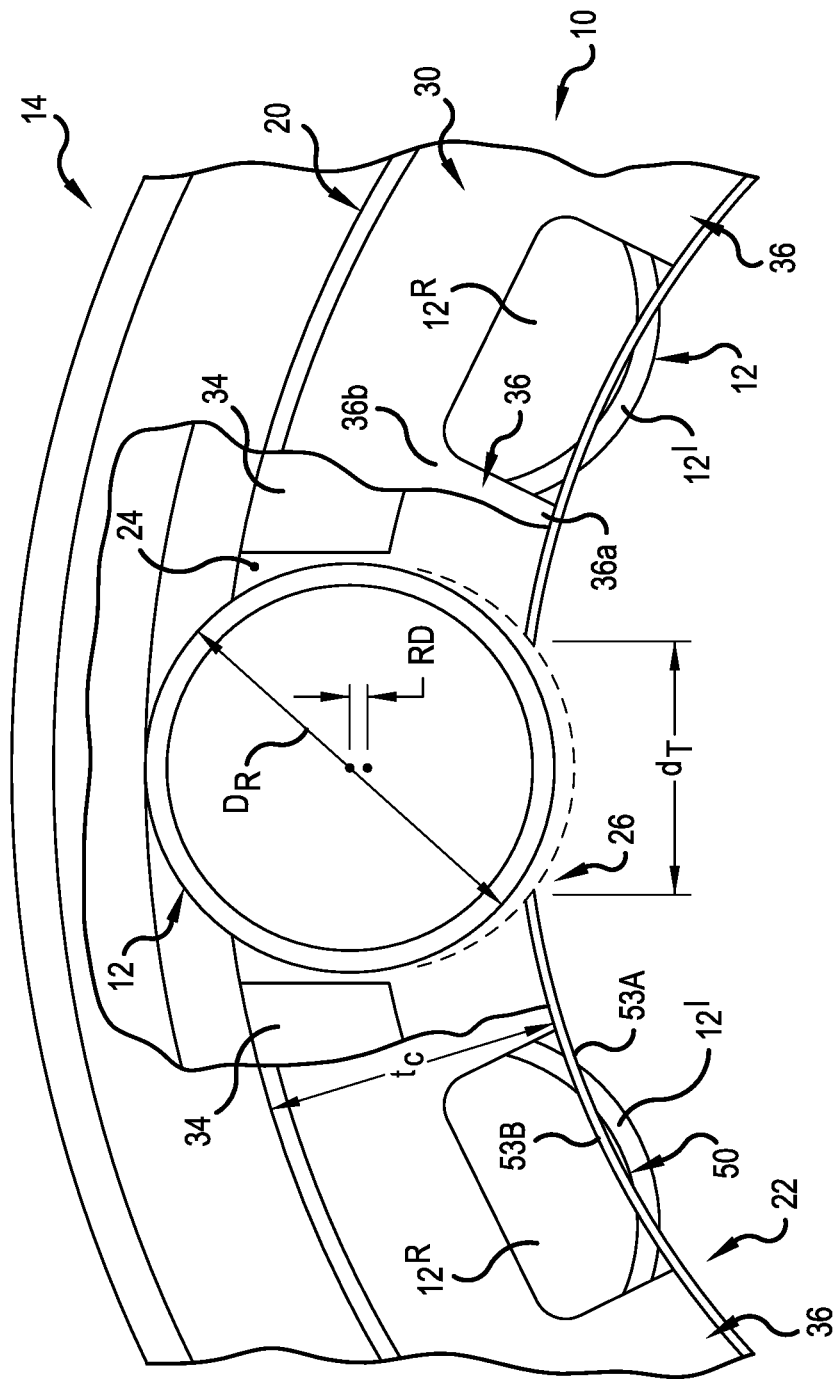
FIG. 14 is an enlarged, broken-away front plan view of a portion of the bearing outer ring with the cage assembly installed.

Further, the flexible annular retainer 22 is disposed against the inner radial end 20a of the cage 20 when the cage assembly 10 is installed within the bearing 14 and has a plurality of through holes 26. Each one of the plurality of retainer holes 26 is radially aligned with a separate one of the plurality of cage pockets 24 and has a dimension $d_T$, which may be a diameter or a width as described below, with a value less than a diameter $D_R$ of each rolling element 12. As such, a radially inner portion $12^I$ of the rolling element 12 contained within the aligned cage pocket 24 extends through the retainer hole 26 while a remainder $12^R$ of the rolling element 12 is retained within the cage pocket 24, as indicated in FIGS. 1 and 14.

Preferably, the retainer 22 is configured to be collapsible radially inwardly so as to be insertable within the cage bore BC when the rolling elements 12 are installed within the cage pockets 24, and thereafter expandable radially outwardly after installation of the retainer 22 within the cage 20 so as to become disposed against the inner radial end 20a of the cage 20, as discussed in detail below. Further, the annular retainer 22 is configured to limit radially inward displacement of the rolling elements 12, referred to as "roller drop", so as to facilitate axial displacement of the inner member/shaft 18 into the bearing outer ring 16 during assembly of the bearing 14. Specifically, the retainer 22 limits roller drop by a combination of the sizing of the hole dimension $d_T$ and the radial location of the retainer 22 due to a radial thickness $t_C$ of the cage 20, as described in detail below.

Figure 4:
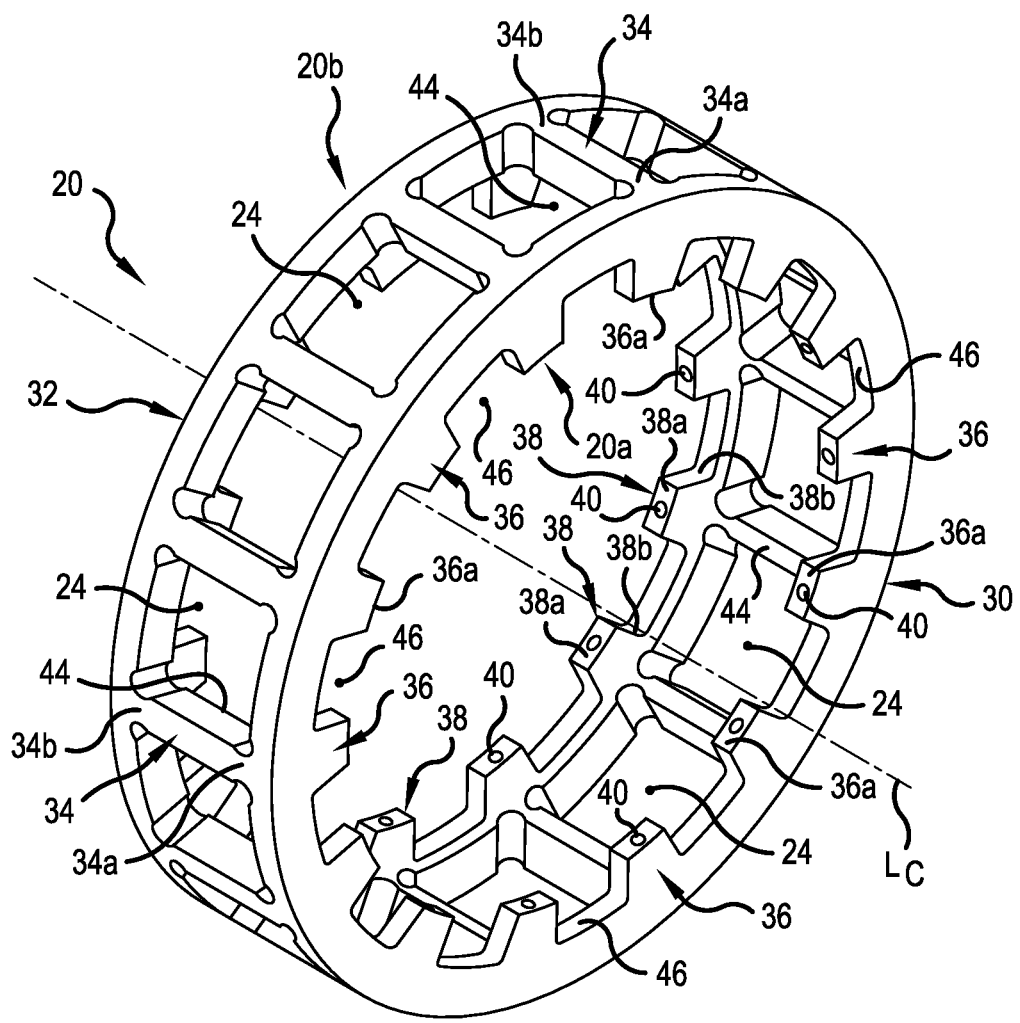
FIG. 4 is a perspective view of an annular cage of the cage assembly.
Figure 5:
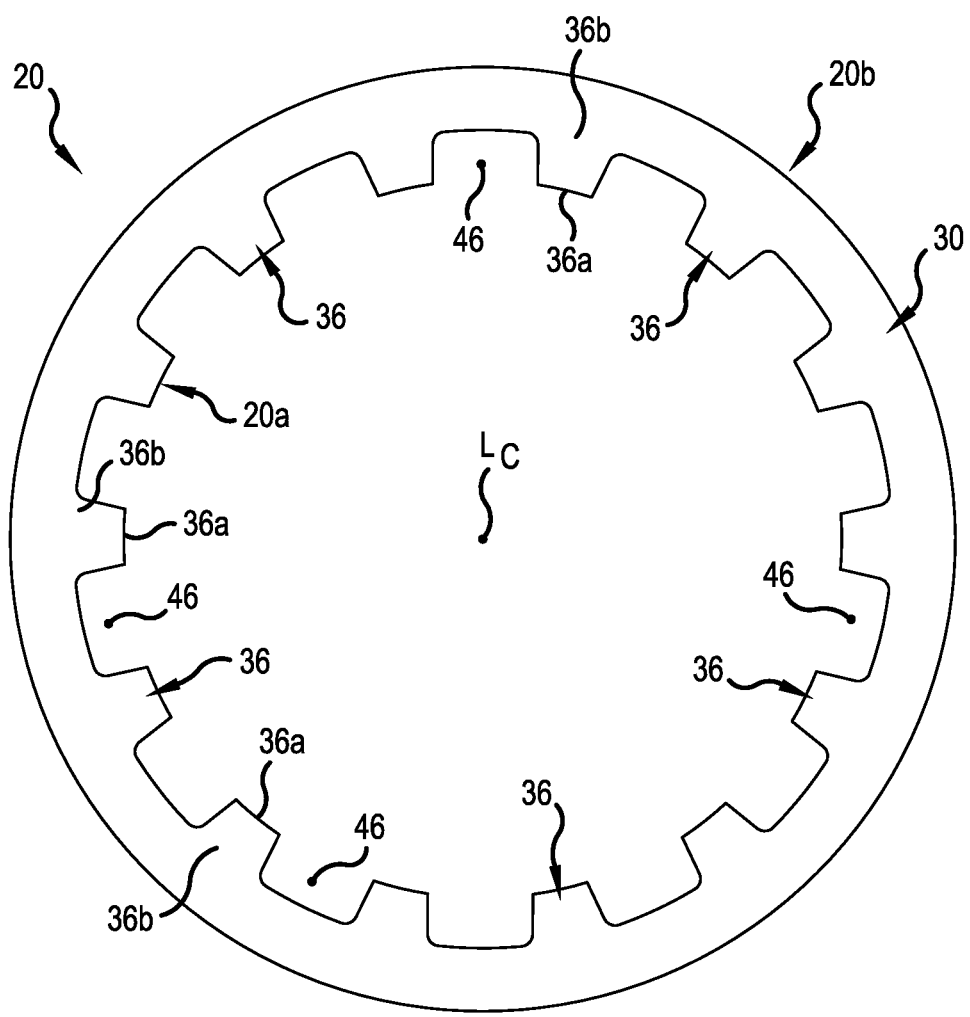
FIG. 5 is a front plan view of the annular cage.
Figure 9:
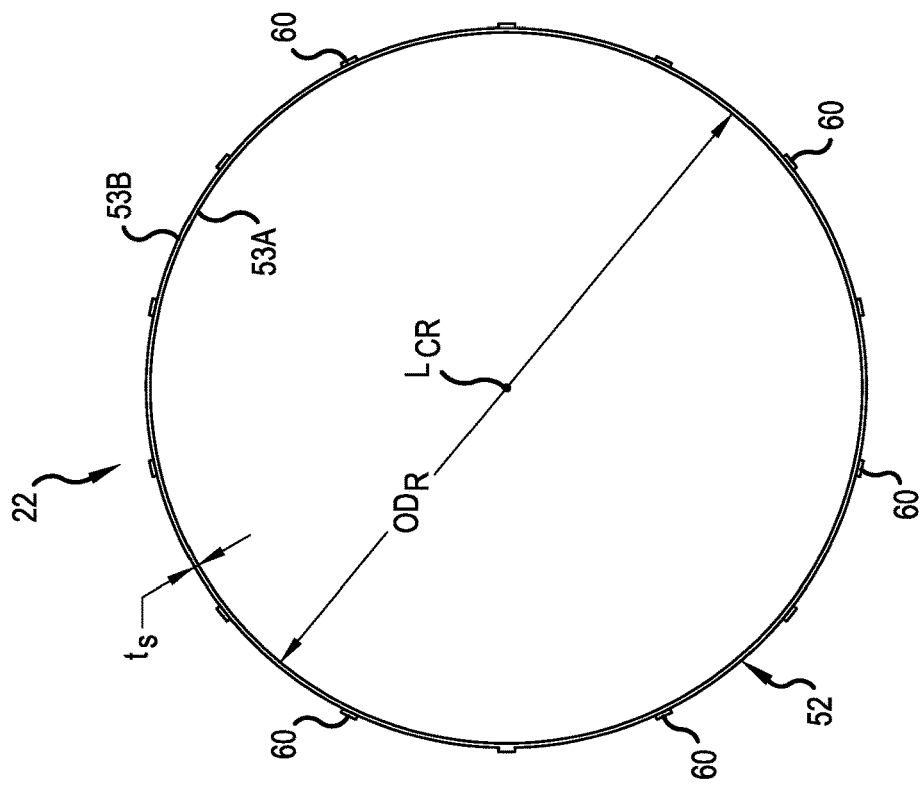
FIG. 9 is a front plan view of the annular retainer.
Figure 8:
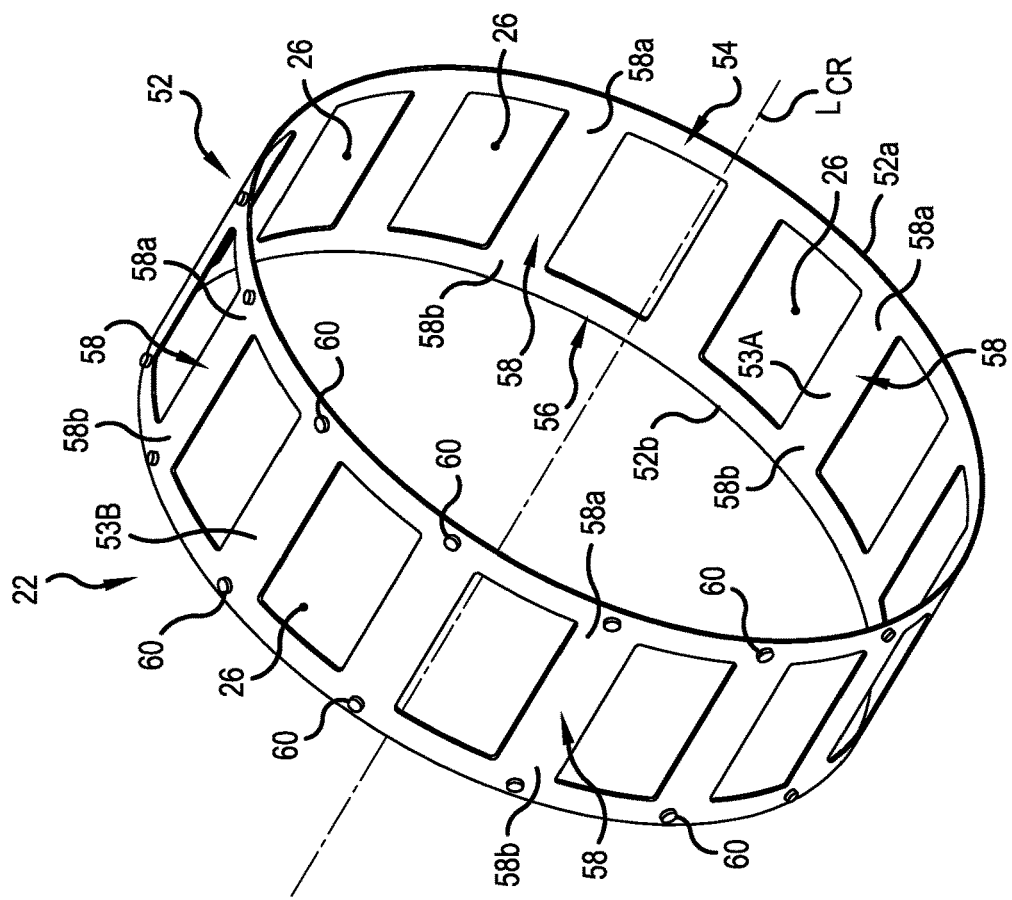
FIG. 8 is perspective view of the annular retainer.

Referring to FIGS. 4-6, the annular cage 20 preferably includes first and second annular side portions 30, 32 and a plurality of transverse portions 34. The transverse portions 34 extend axially between the first and second side portions 30, 32 and each has a first axial end 34a connected with the cage first side portion 30 and a second axial end 34b connected with the cage second side portion 32. Further, the transverse portions 34 are spaced circumferentially about the cage centerline $L_C$ and each one of the plurality of cage pockets 24 is defined circumferentially between two adjacent transverse portions 34 and axially between the first and second side portions 30, 32.

Preferably, the cage 20 further includes a plurality of projections 36, 38 extending radially inwardly from each one of the first and second side portions 32, 34, respectively, and spaced circumferentially about the cage centerline $L_C$. As such, each projection 36 of the first side portion 32 extends radially inwardly from the first axial end 34a of a separate one of the transverse portions 34 and each projection 38 of the second side portion 32 extends radially inwardly from the second axial end 34b of a separate one of the transverse portions 34. Further, each projection 36, 38 has a free inner end 36a, 38a, respectively, and the inner ends 36a, 38a of all of the plurality of projections 36, 38 collectively provide the inner radial end 20a of the annular cage 20.

Thus, with the preferred cage structure, the annular retainer 22 is disposed against the inner ends 36a, 38a of the plurality of projections 36, 38, respectively. Preferably, each projection 36, 38 has a cavity 40 (FIG. 4) extending radially outwardly from the projection inner ends 36a, 38a for receiving a separate protrusion 60 of the retainer 22. Alternatively, the projections 36, 38 may alternatively be formed with a protrusion (not shown) extending radially inwardly and receivable within a separate cavity (not shown) of the retainer 22. In either case, the insertion of the protrusions 60 into the cavities 40 preferably functions to both radially align each retainer hole 26 with one of the cage pockets 24 and to couple the retainer 22 with the cage 20. However, the cage 20 and retainer 22 may be formed without any protrusions and cavities and with the retainer 22 attached to the cage 20 by other means (e.g., clips, fasteners, etc.) such that the retainer holes 26 are aligned with the cage pockets 24.

Further, by forming the cage 20 with the projections 36, 38, a plurality of circumferential openings 44 connecting adjacent pockets 24 is defined between the pair of projections 36, 38 at each end of the transverse portions 34. Also, a plurality of lateral openings 46 are defined between circumferentially adjacent pairs of projections 36 or 38, i.e., at each circumferential end of the pockets 24. These circumferential openings 44 and lateral openings 46 serve both to lighten the cage assembly 10 and provide fluid conduits between and through the pockets 24 for the flow of lubricant (e.g., oil) to and between the rolling elements 12. Alternatively, the annular cage 20 may be formed with "solid" side portions 30, 32 and transverse portions 34, and thus without any projections and openings, such that the retainer 20 is disposed against radial inner ends of each portion 30, 32, 34 (structure not shown).

Referring to FIGS. 7-9 and 13, the annular retainer 22 is preferably formed of an elongated rectangular sheet 50 (FIG. 13) having two opposing longitudinal ends 50a, 50b. The sheet 50 is bent into a cylindrical body 52 of the annular retainer 22, with the two longitudinal ends 50a, 50b being attached to each other or disposed adjacent to each other without attachment. More specifically, the sheet 50 is preferably formed of a relatively thin metallic material, such as an aluminum alloy, low carbon steel, etc., and preferably has a thickness is that is less than ten percent of the thickness of the annular cage 20 and preferably no greater than fifty thousandths of an inch (0.050") or 1.27 millimeters.

Figure 13:
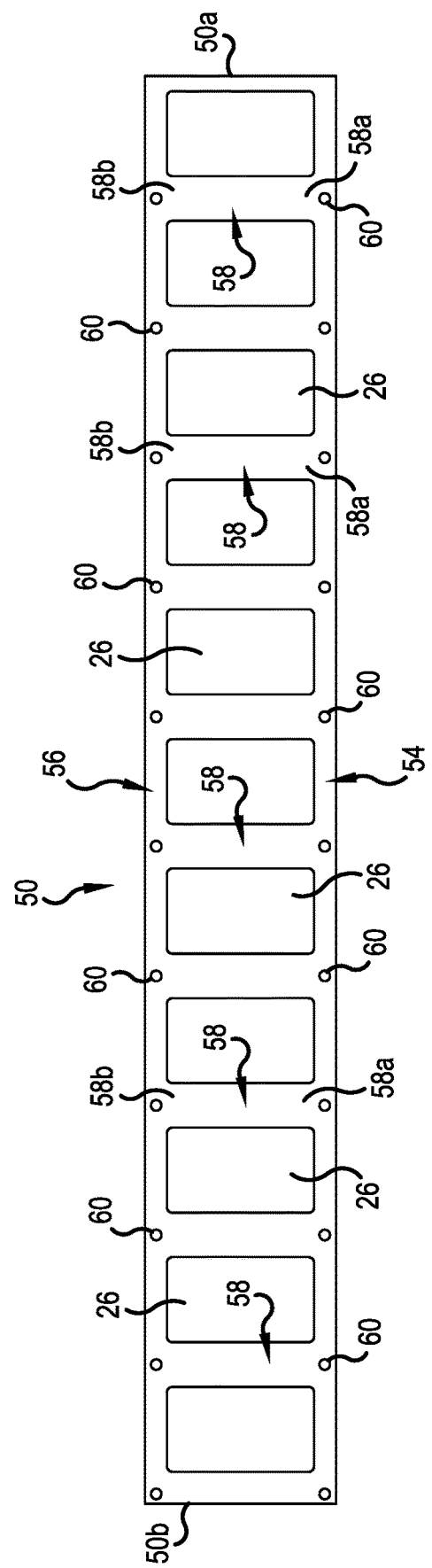
FIG. 13 is top plan view of a sheet used to form the annular retainer.

Referring particularly to FIG. 13, preferably prior to the bending process, the sheet 50 is provided with the plurality of through holes 26 spaced longitudinally between the two ends 50a, 50b, for example by means of laser cutting, stamping, etc. After the formation of the through holes 26, the sheet 50 has two elongated side portions 54, 56 and a plurality of transverse portions 58 extending between the two side portions 54, 56 and spaced longitudinally between the ends 50a, 50b. Thus, the side portions 54, 56 and the transverse portions 58 define or bound the retainer holes 26 in the finished retainer 20. Further, each retainer through hole 26 is preferably rectangular when the rolling elements 12 are rollers, i.e., cylindrical rollers, needles, etc., as depicted in the drawings. However, the through holes 26 may alternatively be generally circular when the rolling elements 12 are balls, frustoconical when the rolling elements 12 are tapered rollers, have curved lateral sides when the rolling elements 12 are spherical rollers or any other appropriate shape correlating to the shape of the rolling element (no alternatives shown).

Furthermore, the sheet 50 is preferably also provided with at least one and most preferably a plurality of the locating protrusions or "dimples" 60 disposed on the sheet side portions 54, 56 at the axial ends 58*a*, 58*b* of each transverse portion 58. The protrusions 60 are each receivable within the cage projection cavities 40 to couple the retainer 22 with the cage 20, as described above and shown in FIGS. 1-3. Alternatively, the sheet 50 may be provided with at least one and preferably plurality of locating cavities for receiving a separate one of a plurality of cage projection protrusions (alternatives not shown), as is also discussed above.

After the sheet 50 is formed with the through holes 26 and protrusions 60 or locating cavities 62, the sheet 50 is bent to form the tubular body 52 of the retainer 20, for example by bending the sheet 50 about a cylindrical mandrel (not shown) with an outside diameter at least about equal to the desired inside diameter (not indicated) of the retainer 22. Thereafter, the two ends 50*a*, 50*b* of the rolled tubular body 52 are preferably attached, for example by welding, brazing, fastening, etc. to form a fixed tubular body 52. Alternatively, the ends 50*a*, 50*b* of the tubular body 52 may be left unattached, such that the body 52 is "overlappable" or coilable as discussed below. Although preferably formed as a bent sheet 50 of metallic material, the tubular body 52 may alternatively be molded of an appropriate polymeric material.

After forming the cylindrical body 52, the retainer includes first and second annular side portions 54, 56, formed respectively from the flat side portions 54, 56 of the sheet 50, and the plurality of transverse portions 58 are spaced circumferentially about a retainer centerline $L_{CR}$. As discussed above, the retainer through holes 26 are defined between two adjacent transverse portions 58 and as such, are similarly spaced circumferentially about the centerline $L_{CR}$. Further, the retainer tubular body 52 has inner and outer circumferential surfaces 53A, 53B and opposing axial ends 52*a*, 52*b*.

Figure 11:
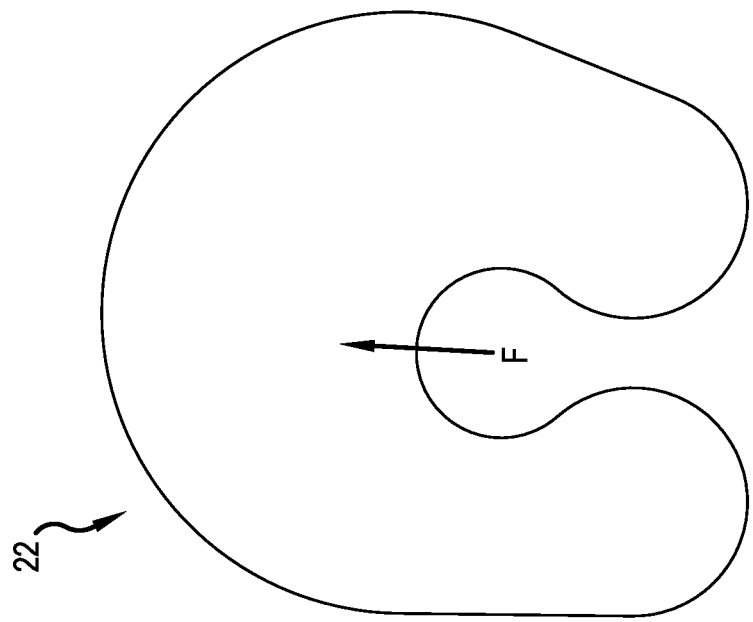
FIG. 11 is another front plan view of the annular retainer, shown in a collapsed state.
Figure 10:
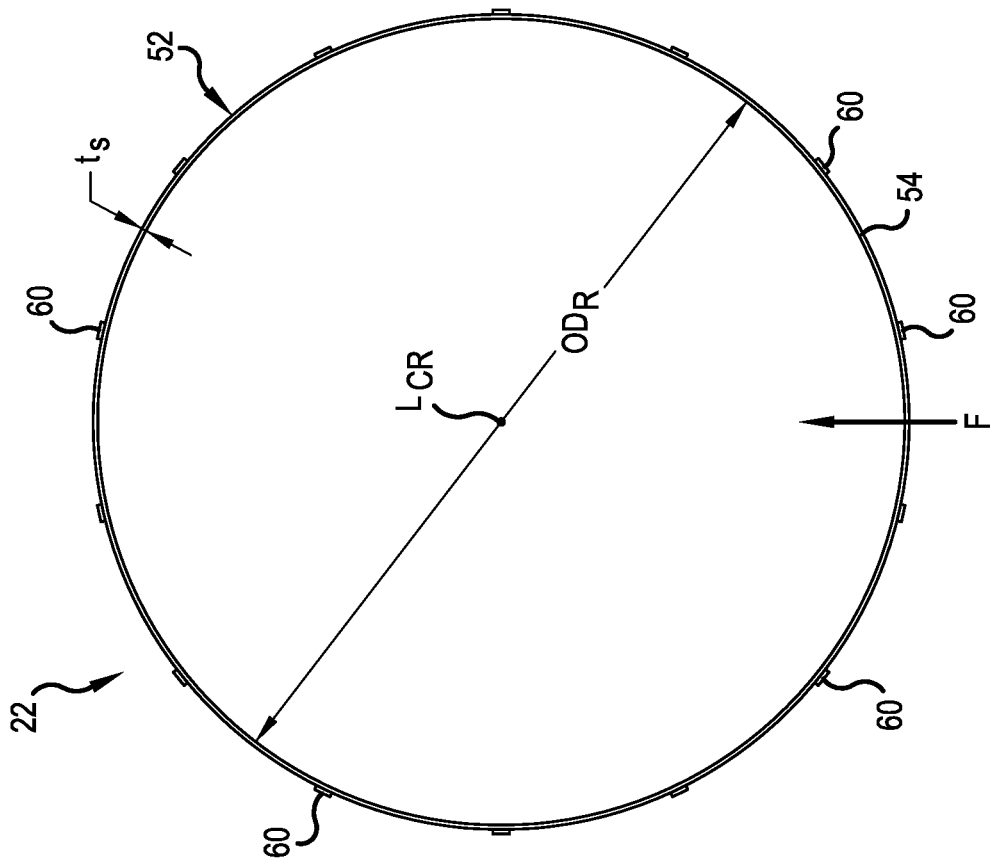
FIG. 10 is front plan view of the annular retainer, indicating a force applied to collapse the retainer.
Figure 12:
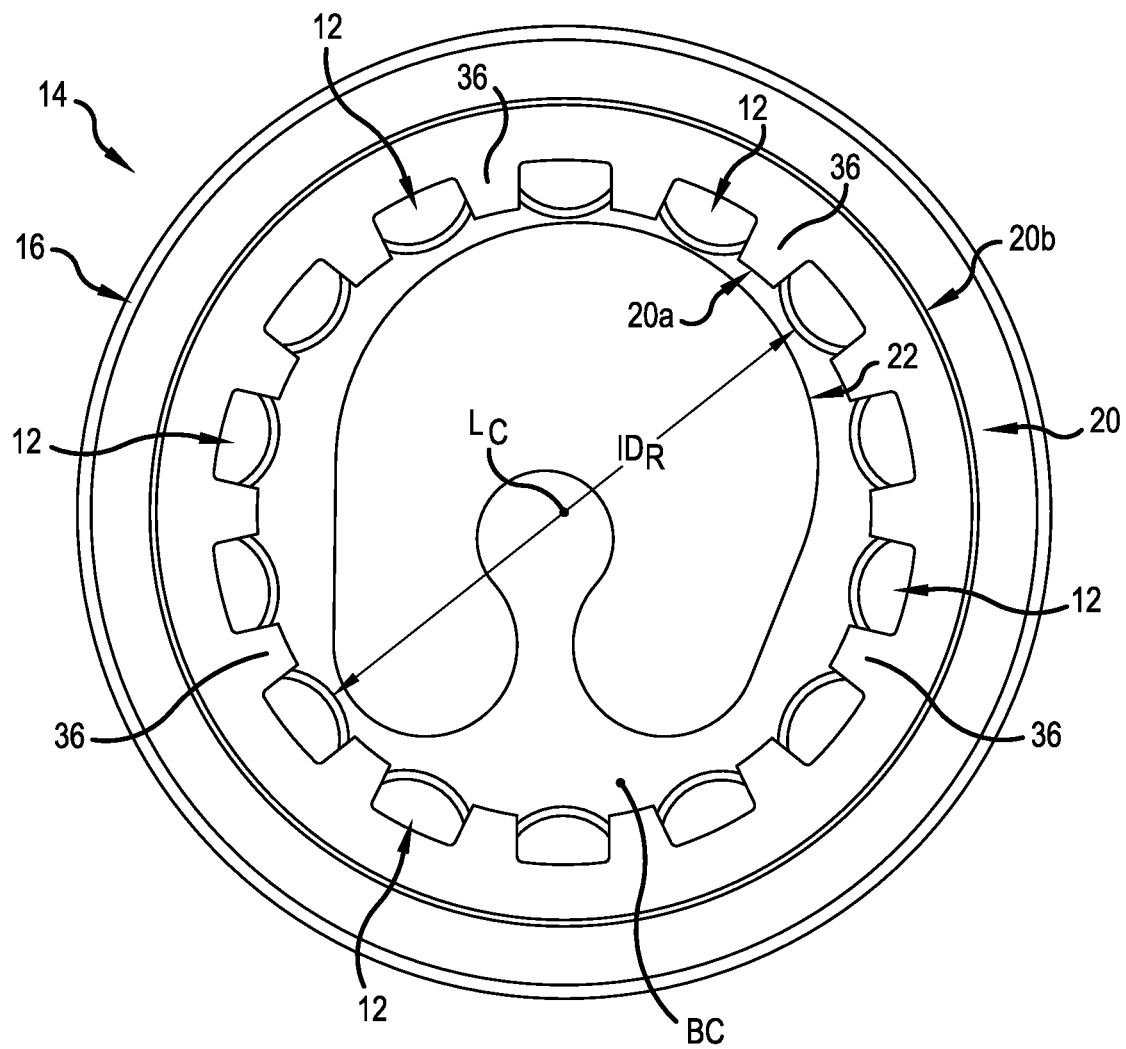
FIG. 12 is front plan view of a bearing outer ring with the annular cage and rolling elements installed and the collapsed retainer placed within a cage bore.

Referring now to FIGS. 10-12, with either of the retainer structures described above, the retainer 22 is collapsible radially inwardly so as to be insertable within the cage bore BC when the rolling elements 12 are installed within the cage pockets 24. When the ends 50*a*, 50*b* of the sheet 50 are fixed as preferred, the retainer 20 is collapsible radially inwardly by applying a force F to bend or deflect at least one portion of the retainer body 52 inwardly with respect to other portions of the body 52 so as to reduce the circumferential perimeter or outside diameter $OD_R$ of the body 52 lesser than an inside diameter IDR collectively formed by the plurality of rolling elements 12, as indicated in FIG. 12. Alternatively, when the body ends 52*a*, 52*b* are unattached, end sections of the tubular body 52 may be overlapped (not depicted) to partially coil the body 52 to reduce the body outside diameter $OD_R$ to fit within the cage bore BC.

In either case, the retainer 22 is then expandable radially outwardly after installation of the retainer 22 within the cage 20 such that radially inner portions of the 12' of rolling elements 12 extend through the retainer holes 26 and the retainer outer surface 23B is disposed against the inner radial end 20*a* of the cage 20, preferably against the projection ends 36*a*, 38*a*. Then, the at least one and preferably the plurality of protrusions 60 of the retainer 20 are inserted into the cavities 40 of the cage 20, or alternatively the projection protrusions 42 are inserted into the retainer cavities 62. In either case when installed, the annular retainer 22 is positioned within the cage bore BC such that the outer circumferential surface 53B of the retainer body 52 is disposed against the inner ends 36*a*, 38*a* of the plurality of projections 36, 38. Further, the flexible annular retainer 22 is collapsible radially inwardly when disposed against the annular cage inner end 20*a* so as to enable subsequent removal of the retainer 22 from the cage bore BC for maintenance of the bearing 14.

Referring particularly to FIG. 14, as mentioned above, the cage assembly 10 is sized to substantially limit "roller drop" of the assembly 10. Specifically, the cage projections 36, 38 are preferably radially sized, i.e., the length between the outer ends 36*b*, 38*b* integrally connected with the side portion 34 or 36 and the free inner ends 36*a*, 38*a*, such that less than ten percent (10%) of the diameter $D_R$ (FIG. 14) of any rolling element 12 projects radially inwardly from the retainer inner circumferential surface 53A, i.e., through the retainer holes 26. That is, the cage 20 is sized with a radial thickness $t_C$ to position the retainer 22 radially proximal to the shaft 18 (or other inner member) and the dimension or width $d_T$ of each retainer hole 26 is sized to minimize the amount of inward radial displacement RD of the rolling elements 12 disposed within the bearing 14 prior to installation of the inner member or shaft 18. With a limited displacement/roller drop RD, a required lead-in chamfer (not shown) of the shaft 18 may be decreased, which leads to a reduction in the weight of the shaft 18.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A cage assembly for rolling elements of a bearing, the bearing having an outer ring, the cage assembly comprising:
    an annular cage disposable within the bearing outer ring and having a centerline, an inner radial end defining a bore, an outer radial end and a plurality of pockets extending between the inner and outer radial ends and spaced circumferentially about the centerline, each pocket being configured to contain a separate one of the rolling elements; and a flexible annular retainer disposed against the inner radial end of the cage and having a plurality of retainer holes, each one of the plurality of retainer holes being radially aligned with a separate one of the plurality of cage pockets and having a dimension with a value less than a diameter of each rolling element such that a radially inner portion of the rolling element contained within the aligned cage pocket extends through the retainer hole while a remainder of the rolling element is retained within the cage pocket;

wherein the cage has at least one cavity extending radially outwardly from the cage inner radial end and the retainer has at least one protrusion disposable within the at least one cavity of the cage so as to align each one of the retainer holes with a separate one of the plurality of cage pockets and/or to removably couple the retainer with the cage.

2. The cage assembly as recited in claim 1 wherein the annular retainer is configured to limit radially inward displacement of the rolling elements so as to facilitate axial displacement of an inner member into the bearing outer ring.

3. The cage assembly as recited in claim 1 wherein the annular retainer is formed of an elongated rectangular sheet having two opposing longitudinal ends, the sheet being bent into a cylinder with the two longitudinal ends being attached or disposed adjacent to each other.

4. The cage assembly as recited in claim 3 wherein the retainer sheet includes two annular side portions and a plurality of transverse portions extending between the two side portions and spaced circumferentially about the centerline, each one of the plurality of retainer holes being defined between two adjacent transverse portions.

5. The cage assembly as recited in claim 3 wherein the retainer sheet has a thickness that is less than ten percent of a radial thickness of the cage and/or less than 1.27 mm.

6. The cage assembly as recited in claim 1 wherein the annular retainer is configured to be collapsible radially inwardly so as to be insertable within the cage bore when the rolling elements are installed within the cage pockets and expandable radially outwardly after installation of the retainer within the cage so as to become disposed against the inner radial end of the cage.

7. The cage assembly as recited in claim 6 wherein the annular retainer is collapsible radially inwardly when disposed against the annular cage inner end so as to remove the retainer from the cage bore.

8. The cage assembly as recited in claim 6 wherein the retainer is fabricated from a sheet of metallic material or molded of a polymeric material.

9. The cage assembly as recited in claim 1 wherein the retainer includes a first annular side portion, a second annular side portion and a plurality of transverse portions extending between the first and second side portions and spaced circumferentially about the centerline, each one of the plurality of retainer holes being defined between two adjacent transverse portions.

10. The cage assembly as recited in claim 1 wherein the cage includes a first annular side portion, a second annular side portion and a plurality of transverse portions extending axially between the first and second side portions and spaced circumferentially about the centerline, each one of the plurality of pockets being defined between two adjacent transverse portions.

11. The cage assembly as recited in claim 10 wherein:
each cage transverse portion has a first axial end connected with the cage first side portion and a second axial end connected with the cage second side portion; and the cage further includes a plurality of projections extending radially inwardly from each one of the first and second side portions, the projections being spaced circumferentially about the centerline such that each projection of the first side portion extends radially inwardly from the first axial end of a separate one of the transverse portions and each projection of the second side portion extends radially inwardly from the second axial end of a separate one of the transverse portions, each projection having a free inner end and the inner ends of the plurality of projections collectively provide the inner radial end of the annular cage, the annular retainer being disposed against each one of the plurality of projection inner ends.

12. The cage assembly as recited in claim 11 wherein the retainer includes a first annular side portion, a second annular side portion and a plurality of transverse portions extending axially between the first and second side portions and spaced circumferentially about the centerline, each one of the plurality of retainer holes being defined between two adjacent transverse portions, the first annular side portion of the retainer being disposed against the inner ends of the projections of the cage first side portion and the second annular side portion of the retainer being disposed against the inner ends of the projections of the cage second side portion.

13. The cage assembly as recited in claim 11 wherein the annular retainer has an inner circumferential surface and an outer circumferential surface disposed against the plurality of projections of the cage, the cage projections being radially sized such that less than twenty percent of the diameter of any rolling element projects radially inwardly from the retainer inner circumferential surface.

14. A cage assembly for rolling elements of a bearing, the bearing having an outer ring, the cage assembly comprising:
an annular cage disposable within the bearing outer ring and having a centerline, an inner radial end defining a bore, an outer radial end and a plurality of pockets extending between the inner and outer radial ends and spaced circumferentially about the centerline, each pocket being configured to contain a separate one of the rolling elements; and a flexible annular retainer disposed against the inner radial end of the cage and having a plurality of retainer holes, each one of the plurality of retainer holes being radially aligned with a separate one of the plurality of cage pockets and having a dimension with a value less than a diameter of each rolling element such that a radially inner portion of the rolling element contained within the aligned cage pocket extends through the retainer hole while a remainder of the rolling element is retained within the cage pocket;

wherein the cage includes a first annular side portion, a second annular side portion, a plurality of transverse portions extending axially between the first and second side portions and spaced circumferentially about the centerline, each one of the plurality of pockets being defined between two adjacent transverse portions and each cage transverse portion has a first axial end connected with the cage first side portion and a second axial end connected with the cage second side portion, and a plurality of projections extending radially inwardly from each one of the first and second side portions, the projections being spaced circumferentially about the centerline such that each projection of the first side portion extends radially inwardly from the first axial end of a separate one of the transverse portions and each projection of the second side portion extends radially inwardly from the second axial end of a separate one of the transverse portions, each projection having a free inner end and the inner ends of the plurality of projections collectively provide the inner radial end of the annular cage, the annular retainer being disposed against each one of the plurality of projection inner ends.

\* \* \* \* \*